(12) United States Patent
Nishimura

(10) Patent No.: US 6,238,800 B1
(45) Date of Patent: May 29, 2001

(54) LENS AND AN OPTICAL APPARATUS WITH THE LENS

(75) Inventor: Takashi Nishimura, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/262,048

(22) Filed: Mar. 4, 1999

(30) Foreign Application Priority Data

Mar. 6, 1998 (JP) .................................................. 10-054850

(51) Int. Cl.⁷ ..................................................... B32B 17/06
(52) U.S. Cl. ........................... 428/428; 427/162; 427/164; 427/167; 427/226; 359/662; 359/642; 359/206; 359/166; 428/426; 428/412; 428/446; 428/522; 351/166
(58) Field of Search .................................. 359/662, 642, 359/206, 166; 428/426, 412, 428, 446, 522; 351/166; 427/162, 164, 167, 226

(56) References Cited

U.S. PATENT DOCUMENTS 4,609,267 * 9/1986 Deguchi et al. .
5,909,314 * 6/1999 Oka et al. .

FOREIGN PATENT DOCUMENTS 62-203744    9/1987  (JP) ................................ B24B/13/00

* cited by examiner

*Primary Examiner*—Deborah Jones
*Assistant Examiner*—Wendy Boss
(74) *Attorney, Agent, or Firm*—Sughrue, Mion, Zinn, Macpeak & Seas, PLLC

(57) ABSTRACT

A lens comprises a lens body having a lens surface with a convex-concave portion and a filler whose optical characteristics are the same as or much similar to that of said lens body, wherein said convex-concave portion of said lens is filled with said filler.

14 Claims, 4 Drawing Sheets

LENS AND AN OPTICAL APPARATUS WITH THE LENS

BACKGROUND OF THE INVENTION

1. Field of the invention

The present invention relates to optical elements of optical products such as cameras, image formation apparatuses in which electrophotographic techniques are used, and relates to a method of producing the optical elements.

2. Description of the Related Art

The grinding method is the most well known method for producing a lens. As an example, Japanese Unexamined Patent Publication No. Sho. 62-203744 discloses the following grinding method.

A grinding bowl having a reciprocal shape of a lens to be ground is prepared in advance. The grinding bowl is pushed against a glass material. Abrasive grains are provided between the grinding bowl and the glass material, so that the grinding bowl can grind the glass material to form a lens. Since super fine abrasive grains are used, there is little grind stress applied to the glass material, and little distortion arising in the inside of the lens. However, this lens producing method can not be conducted unless a shape of the lens to be produced is simple, and thus not all lens shapes can be produced. That is, the shape of the lens is limited, having only a few degrees of freedom.

As higher grades of lens performance become required, techniques for making the lens surface aspherical and more precise become more important. Because it is difficult to produce an aspherical lens using the above grinding method, the aspherical surface is generally formed using a machine controlled by numerical control (hereinafter referred to as "NC"). However, it is difficult to obtain a mirror surface that is suitable for use as a lens after processed using the NC, and a shape error remains in the lens in the order of sub micrometers, and some flaws remain on the processed surface by a working tool.

Ductility mode grinding methods may be used to produce a surface that is suitable for use as a lens, even when grinding fragile materials such as a glass. For example, Japanese Patent Application No. 2-53557 discloses a method of grinding an object to have an aspherical surface. The object to be ground is disposed on a turntable turned by a motor, and a grindstone for grinding the object is disposed in an air spindle turning at a speed of about 10000 rpm. A pulse is detected by a rotary encoder that is directly connected to a rotation axis of the turntable, grinding data is provided to a piezo-actuator on the basis of the detected pulse, and a movable table is continuously moved forward and backward. The air spindle is fed one step for each rotation of the turntable and its position is changed so that the position where the grindstone contacts the object changes. Using this method, it is possible to grind freely the object to asymmetrical and aspherical shapes. Moreover, because it is possible to control a cutting depth of the grindstone against the object in the order of sub-micrometers, fragile materials can be ground to obtain a mirror surface that may be used as a lens.

However, this method is time-consuming, as a significant amount of time is required to grind the aspherical parts of the lens surface. Moreover, a ground surface of the lens after the grinding has some convex or concave flaws in the order of sub micrometers. In the case of requiring to produce a lens with high resolution, there arises a problem where the optical characteristics of the lens are adversely affected by these slight flaws. Thus, a final step is required when processing the optical element such as a lens by the NC.

A polishing method is often used in the final step. For example, the lens surface is further polished with diamond grindstones and a soft pad such as felt, thereby forming a better lens surface.

Three kinds of factors indicating the error of the lens surface are well known.

The first is an undulation (in the order of from several hundreds micrometers to several millimeters).

The second is a surface roughness (in the order of from sub micrometers to several micrometers).

The third is a flaw made by the grinding (in the order of from several dozen micrometers to several hundreds micrometers).

In the above, the undulation of the lens strongly depends on a machine precision. Thus, it is difficult to correct the undulation of the lens surface in the final step, and it is required that the undulation is made quite little in the step of the NC.

On the other hand, the surface roughness may be fully improved in the final step (polishing).

The flaw is in a place between the undulation and the surface roughness. When polishing the flaws to improve the lens surface, the whole lens shape is degraded and the undulation is increased. Furthermore, because these flaws result from contacting tools which hit the lens surface, the flaws can not be reduced as the undulation which can be reduced by the NC.

As mentioned above, the NC may process the object to the complicated lens shape. However, since the NC is conducted by machines, it is impossible to prevent the lens surface from making the flaws. In the worse case, deterioration of the lens characteristics may occur.

Conventionally, a coating method is used to improve the lens. However, its purpose is to prevent a ray of light reflecting on the lens and the coating is conducted along the shape of the lens surface. Therefore, the convex or concave of the lens surface may not be modified.

SUMMARY OF THE INVENTION

The object of the present invention is to provide a shape formation method by which an optical element such as a lens may be processed in high precision.

According to the present invention, there is provided a lens comprising:

a lens body having a lens surface with a convex-concave portion; and a filler whose optical characteristics are the same as or much similar to that of the lens body, wherein the convex-concave portion of the lens is filled with the filler.

The filler may contain a $SiO_2$.

The $SiO_2$ maybe filled with a method comprising the steps of:

coating a polysilazane on the lens surface; and burning the polysilazane to be transferred to the $SiO_2$.

The filler may contain a polymer. The filler may contain an acrylic polymer. The filler may contain an ultraviolet cure resin. The convex-concave portion is no more than 500 $\mu$m in width, 1 $\mu$m in depth and 500 $\mu$m in pitch.

To achieve the above object, there is provided a lens process method according to the present invention as follows. Namely, the lens is filled in the flaw portions of the lens with a material whose optical characteristics are similar to the lens, so that the lens surface may be smoothed and the flaws may be reduced. For example, inorganic materials such as $SiO_2$ or organic materials such as a polymer are suitable to the filled material.

There are several methods to fill the material in the flaw. $SiO_2$ may be filled in the flaw by a vacuum evaporation, a plasma CVD or the like. Polysilazane may be coated on the surface and burnt thereon to be transformed into silica ($SiO_2$). (Polysilazane is a polymer including Si, N and H (sometimes including organic group).) And, a resin material is coated on the lens to form a coated film.

DETAILED DESCRIPTION OF THE PRESENT INVENTION

The present invention will now be described with reference to the accompany drawings.
(Embodiment 1)

Figure 1:
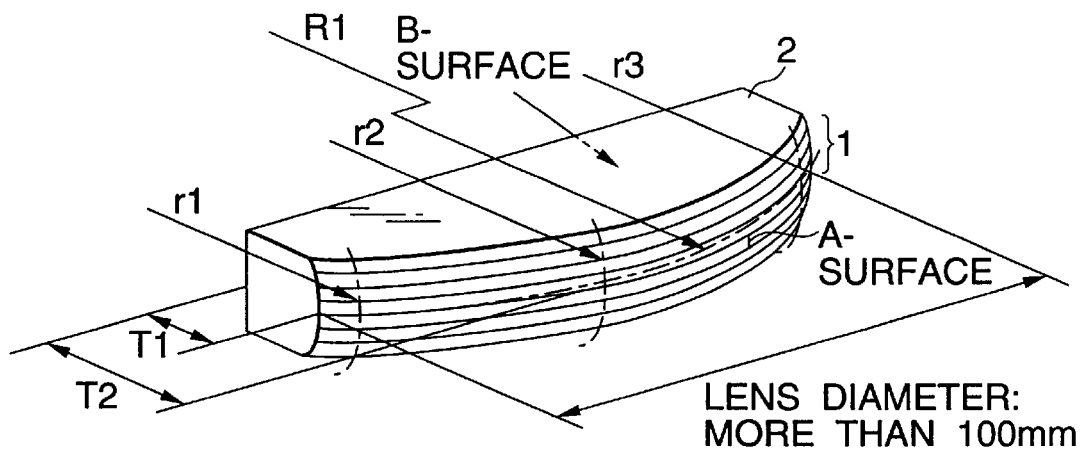
FIG. 1 is a perspective view of a nonaxisymmetric aspherical fθ lens.
Figure 2:
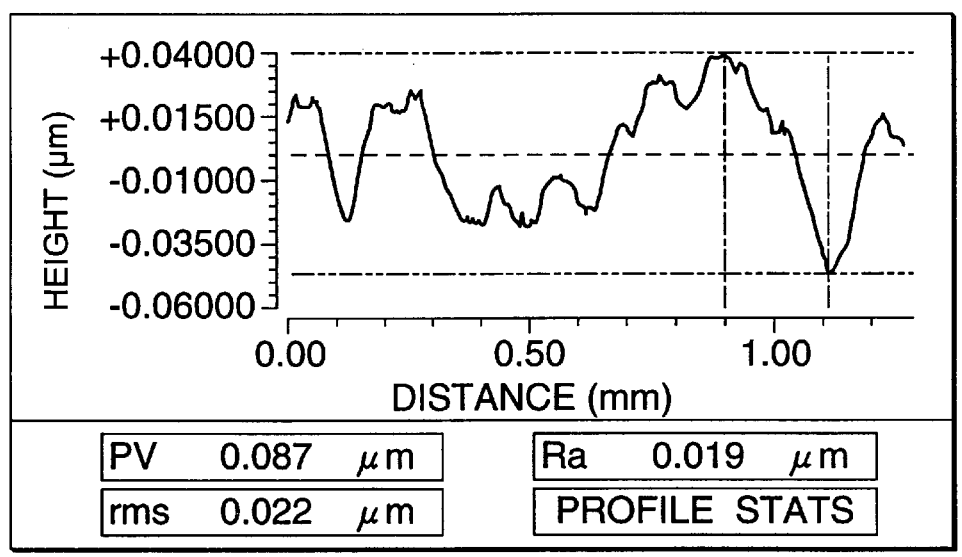
FIG. 2 is a graph showing a measurement result of a lens surface shape before coating in Example 1.

FIG. 1 shows an axisymmetric aspherical fθ glass lens used in the Embodiment 1. BK7 is used as a glass material of the lens. An A-surface of the glass material has a horizontal scanning direction radius of curvature of R1, and perpendicular scanning directions radii of curvature of r1, r2 and r3 are different from one another depending on positions thereof. The A-surface is referred to as a modified toric shape. A B-surface has a flat shape. Both of the A-surface and B-surface have a mirror surface. The A-surface is processed by the NC to have an aspherical shape. In the Embodiment 1, a ductility mode grinding is conducted, resulting in that the ground surface of the glass almost becomes the mirror surface by only the grinding. However, flaws 1 are made by grindstones in the horizontal scanning direction of the lens 2, which results from a process principle of the NC. In this case, the flaws are about 100 μm in width, about 0.087 μm in maximum depth, about 100 μm in pitch. The surface roughness is measured to be 0.019 μm in average, and the undulation of the glass lens surface is measured to be 0.28 μmP-P in the region of 8 mm in the perpendicular scanning direction. FIG. 2 shows a measured result of the lens surface shape. The undulation of the lens surface is measured with a contact-type shape measuring instrument. The shape measurement of the flaws and the surface roughness measurement are conducted with non-contact-type shape measurement instrument. Only the measurement result of the lens surface shape is shown in FIG. 2 in this embodiment, as same as the other embodiments.

Figure 3:
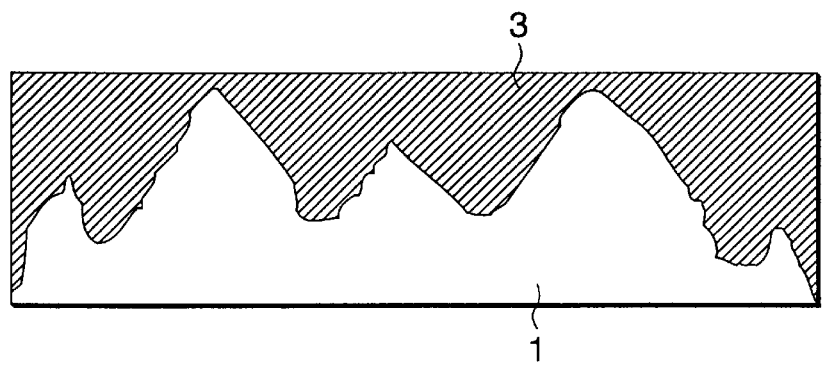
FIG. 3 is a schematic view of a coating according to the present invention.

As shown in FIG. 3, the convex and concave portions of the lens surface are filled with a transparent material 3 as a filter. $SiO_2$ is used as the transparent material in this embodiment. Here, the method is used in which polysilazane is coated on the lens surface and burnt to be transformed into $SiO_2$. Polysilazane is a polymer including Si, N and H (sometimes including organic groups). The polysilazane is transformed into silica when the polysilazane is burnt. Here, Silazane is a compound having a Si—N bonding and the Polysilazan it has $SiH_2NH$ as a composition. TONEN POLYSILAZANE, produced by Tonen Corporation, is dissolved with xylene and the glass lens is put into the solution. Thereafter, the lens is removed from the solution, so that the convex and concave portions of the lens are filled with the polysilazan. After naturally drying the coated lens, the coated surface is burnt in an electric heating furnace at 500° C. for one hour. Thereafter, the polysilazane has transformed to a pure silica glass of substantially 100 percent when analyzing the filled portions. In this manner, the filled material whose optical characteristics are substantially as well as those of the lens material may be easily produced with the polysilazane. The silica glass film layer is 0.3 μm in thickness, 0.003 μm in average surface roughness and 0.33 μmP-P in undulation in the center region of 8 mm.

Figure 4:
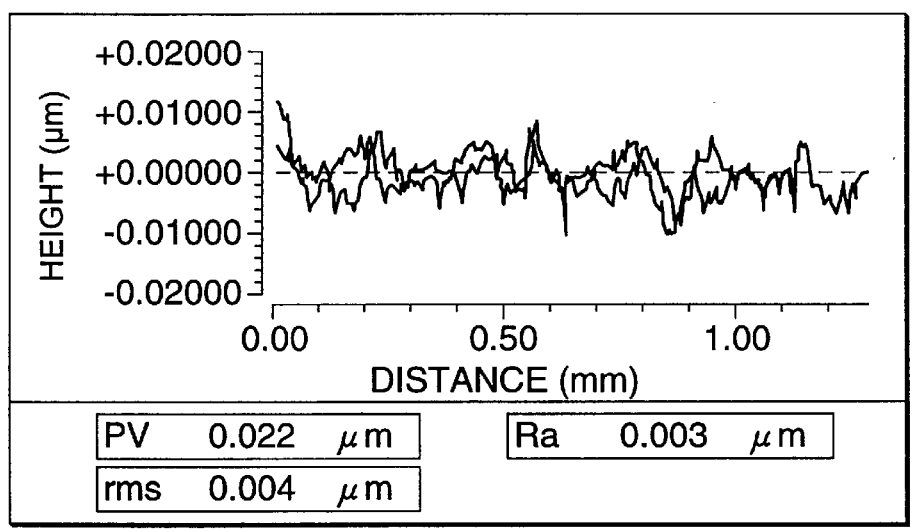
FIG. 4 is a graph showing a measurement result of a lens surface shape after the coating in Example 1.

FIG. 4 shows a result of the shape measurement, as apparent from which a flaw depth is improved from 0.087 μm to 0.022 μm as compared with FIG. 2, and it can be understood that the lens surface is smoothed by filling $SiO_2$.
(Embodiment 2)

Figure 5:
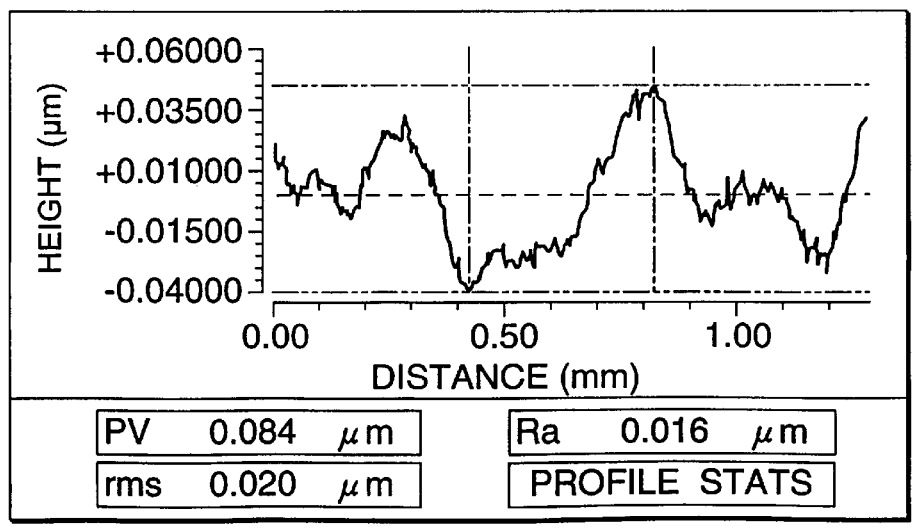
FIG. 5 is a graph showing a measurement result of the lens surface shape before the coating in Example 2.

In this Embodiment, the polysilazane is coated on the surface by a spincoater. Here, a nonaxisymmetric aspherical Fθ glass lens that is the same as that of Embodiment 1 is used as a sample. FIG. 5 shows a result of shape measurement of the lens surface before coating the polysilazane. In this case, the lens flaws are about 100 μm in width, about 0.084 μm in maximum depth and about 100 μm in pitch. The surface roughness is 0.016 μm in average, the undulation of the glass lens surface is 0.32 μmP-P in the region of 8 mm in the perpendicular scanning direction.

Figure 6:
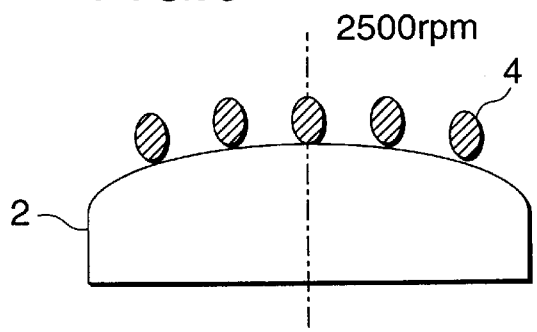
FIG. 6 is a schematic view showing a resin coating method with a spincoater.
Figure 7:
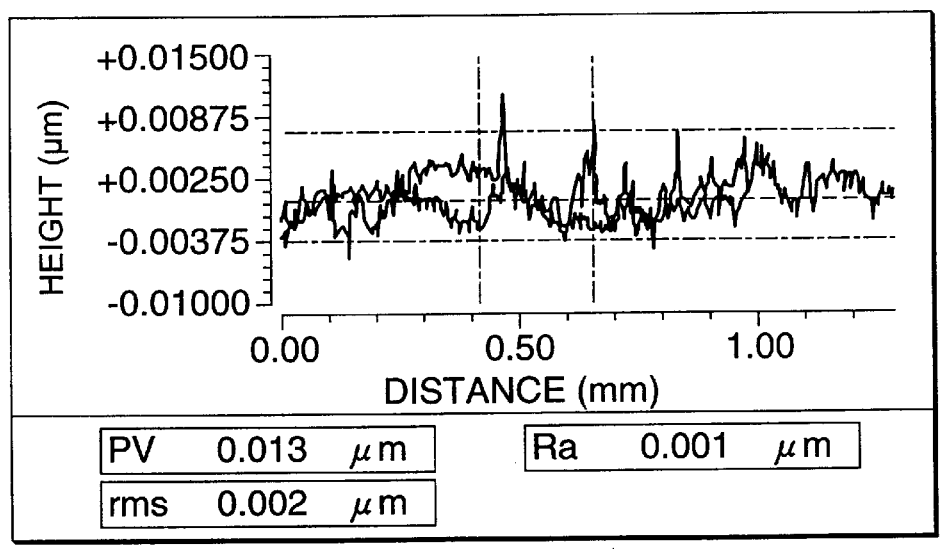
FIG. 7 is a graph showing a measurement result of the lens surface shape after the coating in Example 2.

Lens 2 is mounted in the spincoater (not shown). As shown in FIG. 6, Polysilazanes 4 are dropped at 5 points on the lens of which each of Polysilazanes is dropped apart from 20 mm respectively. And, the spincoater is rotated at a rotation speed of 2500 rpm to coat the polysilazane thereon. After naturally drying the lens surface, the coated surface is burnt in an electric heating furnace at 500° C. for one hour, so that the pure silica glass film is coated. FIG. 7 shows a result of the shape measurement, which is upgraded on optical characteristics.

The silica glass film layer is 0.2 μm in average thickness, 0.001 μm in average surface roughness, 0.22 μmP-P in undulation in the center region of the sample of 8 mm and 0.013 μm in maximum depth. From the measurement results, it may be understood that the lens surface is smoothed by filling $SiO_2$.

The finished lens is mounted on an optical system in a laser printer. When measuring light gathering characteristics thereof, a uniform beam whose radius is 60 μm is obtained in the whole scanning width. And, when printed out using the laser printer mounting the finished lens, the laser printer can conduct a high quality printing compared with a laser printer using a lens which is made by only the NC.
(Embodiment 3)

Using an ultraviolet cure resin including acrylic acid group, it is tried to reduce the flaw on the lens surface. Optical characteristics such as refraction index of the ultraviolet cure resin including acrylic acid group are much similar to those of the material of which the lens is made. The ultraviolet cure resin is diluted with an isopropyl alcohol, so that the ultraviolet cure resin having a viscosity of about 15 cp is produced. Using the spincoater in the manner as mentioned in Embodiment 2, the convex and concave portions of the lens are filled with the ultraviolet cure resin. Thereafter, a ray of ultraviolet is irradiated on the lens surface on which the ultraviolet cure resin is coated to cure the ultraviolet resin. The same lens as used in embodiment 1 and 2 is used in this embodiment.

Figure 8:
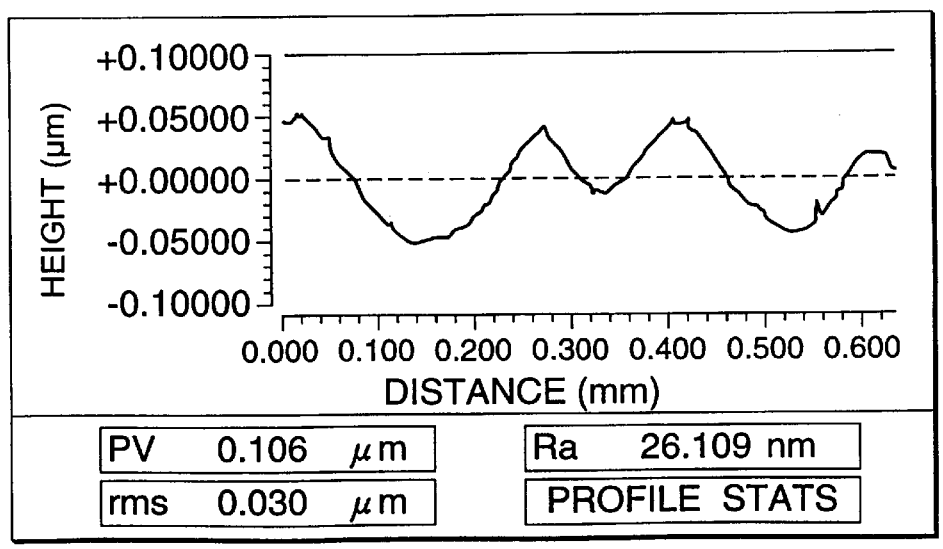
FIG. 8 is a graph showing a measurement result of the lens surface shape before the coating in Example 3.

FIG. 8 shows a shape measurement result of the lens surface which has not yet been coated with the resin. In this case, the flaw is measured to be about from 100 $\mu$m to 200 $\mu$m in width, 0.106 $\mu$m in the maximum depth and about from 150 $\mu$m to 250 $\mu$m in pitch. The lens surface is measured to be 0.026 $\mu$m in average surface roughness and 0.41 $\mu$m in undulation in the range of 8 mm in the perpendicular scanning direction.

Figure 9:
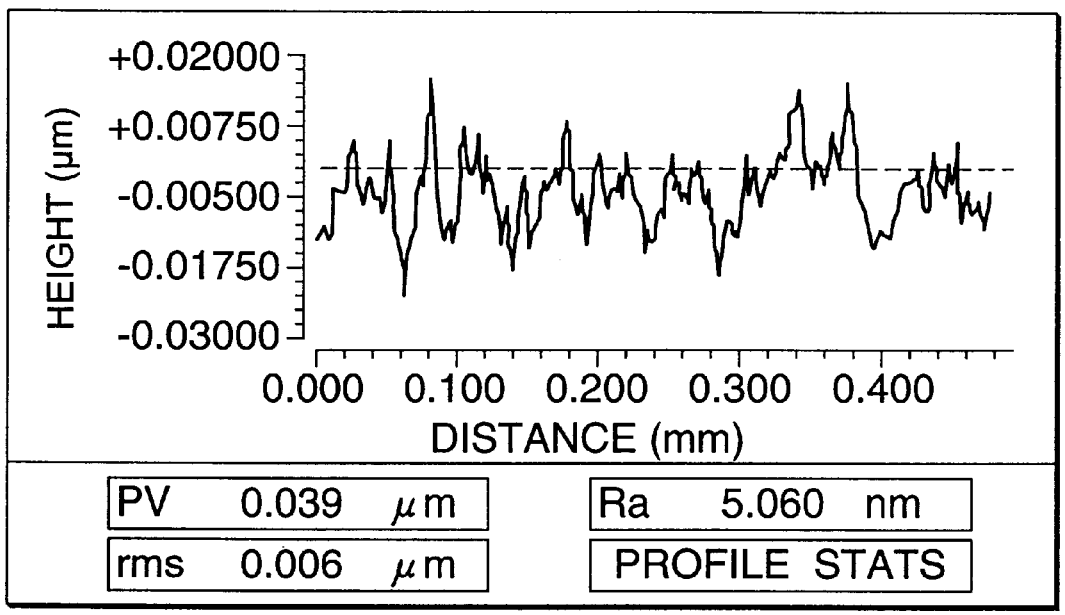
FIG. 9 is a graph showing a measurement result of the lens surface shape after the coating in Example 3.

FIG. 9 shows a shape measurement result of the lens surface after the surface was coated with the resin. The resin layer is 0.25 $\mu$m in average surface roughness. The lens surface is improved to 0.005 $\mu$m in average surface roughness and 0.30 $\mu$m in undulation in the range of 8 mm in the perpendicular scanning direction. These results explain that the surface has been smoothed.

Using methods according to the present invention as mentioned above, the flaws which are made during the machine process may be reduced efficiently and easily.

As a result, a lens which has a complicated shape and is required high precision may be easily produced in a short period of time.

What is claimed is:

1. A lens comprising:
   a lens body having a lens surface with flaws having convex-concave portions; and
   a filler whose optical characteristics are the same as or similar to that of said lens body,
   wherein said filler fills said flaws to reduce the presence of said flaws on said lens surface.

2. A lens as claimed in claim 1, wherein said filler contains a $SiO_2$.

3. A method of smoothing a surface of a lens, comprising the steps of:
   providing a lens having a lens body and a lens surface, said lens surface having flaws with convex-concave portions;
   coating polysilazane on said lens surface to fill in said flaws; and
   burning said polysilazane to cause said polysilazane to be transformed to $SiO_2$.

4. A lens as claimed in claim 1, wherein said filler contains a polymer.

5. A lens as claimed in claim 1, wherein said filler contains an acrylic polymer.

6. A lens as claimed in claim 1, wherein said filler contains an ultraviolet cure resin.

7. A lens as claimed in claim 1, wherein said flaws are no more than 500 $\mu$m in width and 1 $\mu$m in depth, and are disposed no more than 500 $\mu$m from each other.

8. A lens as claimed in claim 7, wherein said filler contains a $SiO_2$.

9. A method of smoothing a surface of a lens, comprising the steps of:
   providing a lens having a lens body and a lens surface, said lens surface having flaws with convex-concave portions, wherein said flaws are no more than 500 $\mu$m in width and 1 $\mu$m in depth, and disposed no more than 500 $\mu$m from each other;
   coating polysilazane on said lens surface to fill in said flaws; and
   burning said polysilazane to cause said polysilazane to be transformed to $SiO_2$.

10. A lens as claimed in claim 7, wherein said filler contains a polymer.

11. A lens as claimed in claim 7, wherein said filler contains an acrylic polymer.

12. A lens as claimed in claim 7, wherein said filler contains an ultraviolet cure resin.

13. An optical apparatus comprising a lens according to the claim 9.

14. An optical apparatus comprising a lens according to the claim 10.

* * * * *